US012748192B2

(12) United States Patent
Zhang et al.

(10) Patent No.: US 12,748,192 B2
(45) Date of Patent: Sep. 29, 2026

(54) GALVANOMETER-BASED LASER SYNCHRONIZATION CONTROLLING METHOD, CALIBRATION METHOD AND APPARATUS AND LIDAR

(71) Applicant: SUTENG INNOVATION TECHNOLOGY CO., LTD., Shenzhen (CN)

(72) Inventors: Hankui Zhang, Shenzhen (CN); Yipeng Li, Shenzhen (CN); Peng Wang, Shenzhen (CN); Guanxing Pei, Shenzhen (CN); Xiao Shen, Shenzhen (CN); Feng Zhang, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 486 days.

(21) Appl. No.: 18/378,143

(22) Filed: Oct. 9, 2023

(65) Prior Publication Data

US 2024/0142583 A1 May 2, 2024

(30) Foreign Application Priority Data

Oct. 31, 2022 (CN) ........................ 202211346893.6

(51) Int. Cl.
*G01S 7/481* (2006.01)
*G01S 17/89* (2020.01)
*G02B 26/10* (2006.01)

(52) U.S. Cl.
CPC ............ *G01S 7/4817* (2013.01); *G01S 17/89* (2013.01); *G02B 26/101* (2013.01)

(58) Field of Classification Search
CPC ..... G01S 7/4817; G01S 17/89; G02B 26/101; G02B 26/105
See application file for complete search history.

(56) References Cited

U.S. PATENT DOCUMENTS

| | | | | |
|---|---|---|---|---|
| 11,054,635 | B1 * | 7/2021 | Yaser | G02B 26/101 |
| 2016/0047903 | A1 * | 2/2016 | Dussan | G01S 7/4817 356/5.01 |
| 2020/0186765 | A1 * | 6/2020 | Saracco | G02B 27/0025 |
| 2020/0395946 | A1 * | 12/2020 | Pu | H03L 7/099 |

OTHER PUBLICATIONS

First Office Action issued in related Chinese Application No. 202211346893.6, mailed Aug. 24, 2024, 7 pages.

* cited by examiner

*Primary Examiner* — Michael E Teitelbaum
(74) *Attorney, Agent, or Firm* — BAYES PLLC

(57) ABSTRACT

This application relates to a galvanometer-based laser synchronization controlling method, calibration method and apparatus, and a LiDAR. The galvanometer-based laser synchronization controlling method includes obtaining a fast-axis feedback signal when a galvanometer scans; obtaining a first phase difference between a fast-axis drive signal and the fast-axis feedback signal and obtaining a second phase difference between an emission period of a laser beam and the fast-axis drive signal; and setting a phase for the fast-axis drive signal based on the first phase difference and the second phase difference.

12 Claims, 14 Drawing Sheets

GALVANOMETER-BASED LASER SYNCHRONIZATION CONTROLLING METHOD, CALIBRATION METHOD AND APPARATUS AND LIDAR

CROSS-REFERENCE TO RELATED APPLICATION

The present application claims the benefit of priority to Chinese Patent Application No. 202211346893.6, filed on Oct. 31, 2022, which is hereby incorporated by references in its entirety.

TECHNICAL FIELD

This application relates to the technical field of Light Detection and Ranging (LiDAR), and in particular, to a galvanometer-based laser synchronization controlling method, laser synchronization calibration method and apparatus and a LiDAR.

TECHNICAL BACKGROUND

A current development trend of LiDAR has changed from rotary LiDARs to solid-state LiDARs. Technologies used in the solid-state LiDAR include three technologies based on a phased array, 3D flash or Micro-Electro-Mechanical System (MEMS). A MEMS-based LiDAR system is technically easier to implement, with a better effect and lower costs.

For a MEMS-based solid-state LiDAR, a key component of the solid-state LiDAR includes an electromagnetic galvanometer (or referred to as a galvanometer). The galvanometer is used to combine horizontal scanning and vertical scanning into two-dimensional scanning. When a laser beam is emitted to a working galvanometer, the galvanometer reflects the laser beam to each position in the entire image, thereby scanning a two-dimensional field of view. Two scanning directions of the galvanometer correspond to a fast-axis direction and a slow-axis direction respectively, and a fast-axis drive signal drives the galvanometer to perform a resonance movement in the fast-axis direction.

When the laser beam is deflected by the galvanometer and then emitted outward, an emission period of the laser beam needs to match a fast-axis movement of the galvanometer, otherwise spatial coordinates of a point cloud are dislocated in a preset direction. However, due to various reasons, it is hard to implement better synchronization controlling of the emission of the laser beam and the fast-axis movement of the galvanometer.

SUMMARY

To resolve or partially resolve the problems, this application provides a galvanometer-based laser synchronization controlling method and apparatus and a LiDAR, which can better implement synchronization controlling of an emission period of a laser beam and fast-axis movement of a galvanometer.

A first aspect of this application provides a galvanometer-based laser synchronization controlling method, including:

obtaining a fast-axis feedback signal when a galvanometer scans;

obtaining a first phase difference between a fast-axis drive signal and the fast-axis feedback signal;

obtaining a second phase difference between an emission period of a laser beam and the fast-axis drive signal; and setting a phase for the fast-axis drive signal based on the first phase difference and the second phase difference so that the laser beam emitted from a set point is aligned in a preset direction.

In an embodiment, obtaining the first phase difference between the fast-axis drive signal and the fast-axis feedback signal and obtaining the second phase difference between the emission period of a laser beam and the fast-axis drive signal includes:

adjusting a frequency of the fast-axis drive signal, and using a phase difference between the fast-axis drive signal and the fast-axis feedback signal as the first phase difference when amplitude of the fast-axis feedback signal reaches a maximum value as the first phase difference; and adjusting a phase of an emission period of the laser beam, and when the laser beam is aligned at the preset point, obtaining a phase difference between the emission period of the laser beam and the fast-axis drive signal, and using the phase difference as the second phase difference.

In an embodiment, obtaining the first phase difference between the fast-axis drive signal and the fast-axis feedback signal and obtaining the second phase difference between the emission period of the laser beam and the fast-axis drive signal includes:

obtaining the second phase difference between the emission period of the laser beam and the fast-axis drive signal, where the second phase difference is set as a preset value; and adjusting a frequency of the fast-axis drive signal, and when the laser beam is aligned at the preset point, obtaining a phase difference between the fast-axis drive signal and the fast-axis feedback signal, and using the phase difference as the first phase difference.

In an embodiment, setting the phase for the fast-axis drive signal based on the first phase difference and the second phase difference so that the laser beam emitted from the set point is aligned in the preset direction includes:

locking a phase for the fast-axis drive signal and the fast-axis feedback signal based on the first phase difference; and fixing a phase for the emission period of the laser beam and the fast-axis drive signal based on the second phase difference.

In an embodiment, setting the phase for the fast-axis drive signal based on the first phase difference and the second phase difference so that the laser beam emitted from the set point is aligned in the preset direction further includes:

setting a phase for the fast-axis drive signal based on the first phase difference and the second phase difference so that laser beams emitted by a LiDAR when the LiDAR passes by the same set point in a round trip during a fast-axis period are aligned in a vertical direction.

In an embodiment, the method further includes:

when a maximum deflection angle of the galvanometer is a rated angle, obtaining reference amplitude of the fast-axis feedback signal and adjusting amplitude of the fast-axis drive signal in a closed loop so that feedback amplitude of the fast-axis feedback signal of the galvanometer reaches the reference amplitude.

A second aspect of this application provides a galvanometer-based laser synchronization controlling apparatus, including:

a signal obtaining module, configured to obtain a fast-axis feedback signal when a galvanometer scans;

a phase difference module, configured to obtain a first phase difference between a fast-axis drive signal and the fast-axis feedback signal; and obtain a second phase difference between an emission period of a laser beam and the fast-axis drive signal; and a phase processing module, configured to set a phase for the fast-axis drive signal based on the first phase difference and the second phase difference that are obtained by the phase difference module so that the laser beam emitted from a set point is aligned in a preset direction.

In an embodiment, the phase difference module includes:

a first phase difference module, configured to adjust a frequency of the fast-axis drive signal, and to use a phase difference between the fast-axis drive signal and the fast-axis feedback signal as the first phase difference when amplitude of the fast-axis feedback signal reaches a maximum value; and a second phase difference module, configured to adjust a phase of an emission period of the laser beam, and when the laser beam is aligned at the preset point, to obtain a phase difference between the emission period of the laser beam and the fast-axis drive signal, and to use the phase difference as the second phase difference.

In an embodiment, the phase difference module includes:

a second phase difference module, configured to obtain the second phase difference between the emission period of the laser beam and the fast-axis drive signal, where the second phase difference is set as a preset value, and a first phase difference module, configured to adjust a frequency of the fast-axis drive signal, and when the laser beam is aligned at the preset point, to obtain the phase difference between the fast-axis drive signal and the fast-axis feedback signal, and to use the phase difference as the first phase difference.

A third aspect of this application provides a galvanometer-based laser synchronization calibration method, including:

obtaining a fast-axis feedback signal when a galvanometer scans;

determining a first phase difference between a fast-axis drive signal and the fast-axis feedback signal and determining a second phase difference between an emission period of a laser beam and the fast-axis drive signal; and outputting the first phase difference and the second phase difference.

In an embodiment, determining the first phase difference between the fast-axis drive signal and the fast-axis feedback signal and determining the second phase difference between the emission period of the laser beam and the fast-axis drive signal includes:

adjusting a frequency of the fast-axis drive signal, and using the phase difference between the fast-axis drive signal and the fast-axis feedback signal as the first phase difference when amplitude of the fast-axis feedback signal reaches a maximum value; and adjusting a phase of the emission period of the laser beam, and when the laser beam is aligned at a preset point, determining a phase difference between the emission period of the laser beam and the fast-axis drive signal as the second phase difference.

In an embodiment, determining the first phase difference between the fast-axis drive signal and the fast-axis feedback signal and determining the second phase difference between the emission period of the laser beam and the fast-axis drive signal further includes:

determining the second phase difference between the emission period of the laser beam and the fast-axis drive signal as a preset value; and adjusting a frequency of the fast-axis drive signal, and when the laser beam is aligned at a preset point, determining a phase difference between the fast-axis drive signal and the fast-axis feedback signal, and using the phase difference as the first phase difference.

A fourth aspect of this application provides a LiDAR, including the foregoing galvanometer-based laser synchronization controlling apparatus.

In the technical solution provided in this application, after the first phase difference between the fast-axis drive signal and the fast-axis feedback signal is obtained and the second phase difference between the emission period of the laser beam and the fast-axis drive signal is obtained, the phase is set for the fast-axis drive signal based on the first phase difference and the second phase difference so that the laser beam emitted from the set point is aligned in the preset direction. Through the foregoing processing, the phase difference between the fast-axis drive signal and the fast-axis feedback signal is locked, the phase difference between the emission period of the laser beam and the fast-axis drive signal of the galvanometer is locked, and in this way, the laser beam emitted from the set point is aligned in the preset direction, and the emission period of the laser beam matches the fast-axis movement, thereby better implementing synchronization controlling of the emission period of the laser beam and the fast-axis movement of the galvanometer.

Further, when a maximum deflection angle of the galvanometer is a rated angle, amplitude of the fast-axis feedback signal of the galvanometer, that is, the reference amplitude, can be obtained and the amplitude of the fast-axis drive signal is adjusted in the closed loop so that the feedback amplitude of the fast-axis feedback signal of the galvanometer reaches the reference amplitude. Through the foregoing processing, the amplitude of the fast-axis movement of the galvanometer is prevented from being affected by a change in air pressure, and real-time air pressure adaptability during the working process of the galvanometer is implemented.

It should be understood that the above general descriptions and the following detailed descriptions are only exemplary and explanatory.

BRIEF DESCRIPTION OF DRAWINGS

Exemplary embodiments of the present application are described more specifically with reference to the accompanying drawings, to more expressly illustrate the above and other objectives, features and advantages of the present application. In the exemplary embodiments of the present application, the same reference numerals generally represent the same components.

DETAILED DESCRIPTION

The following describes embodiments of the present application with reference to the accompanying drawings. Although the embodiments of the present application are shown in the accompanying drawings, it should be understood that the present application can be implemented in various forms.

The terms used in the embodiments of the present application are merely for the purpose of illustrating some embodiments. The singular forms of "a", "the" and "this" as used in the present application and the appended claims are also intended to include plural forms, unless the context clearly indicates otherwise. The term "and/or" used in this specification refers to any combination of one or more of the associated items listed and all possible combinations thereof.

Although the terms "first", "second", "third", and the like are used to describe various types of information in the present application, the information should not be limited to these terms. The terms are only used to distinguish between information of the same type. For example, without departing from the scope of the present application, first information can also be referred to as second information, and similarly, second information can also be referred to as first information. Therefore, a feature with a determiner such as "first" or "second" can expressly or implicitly include one or more features. In the description of the present application, "a plurality of" means two or more, unless otherwise specifically defined.

This application provides a galvanometer-based laser synchronization controlling method, which can better implement synchronization controlling of emission of a laser beam and fast-axis movement of a galvanometer.

The technical solution in the embodiments of this application is detailed below with reference to accompanying drawings.

Figure 1:
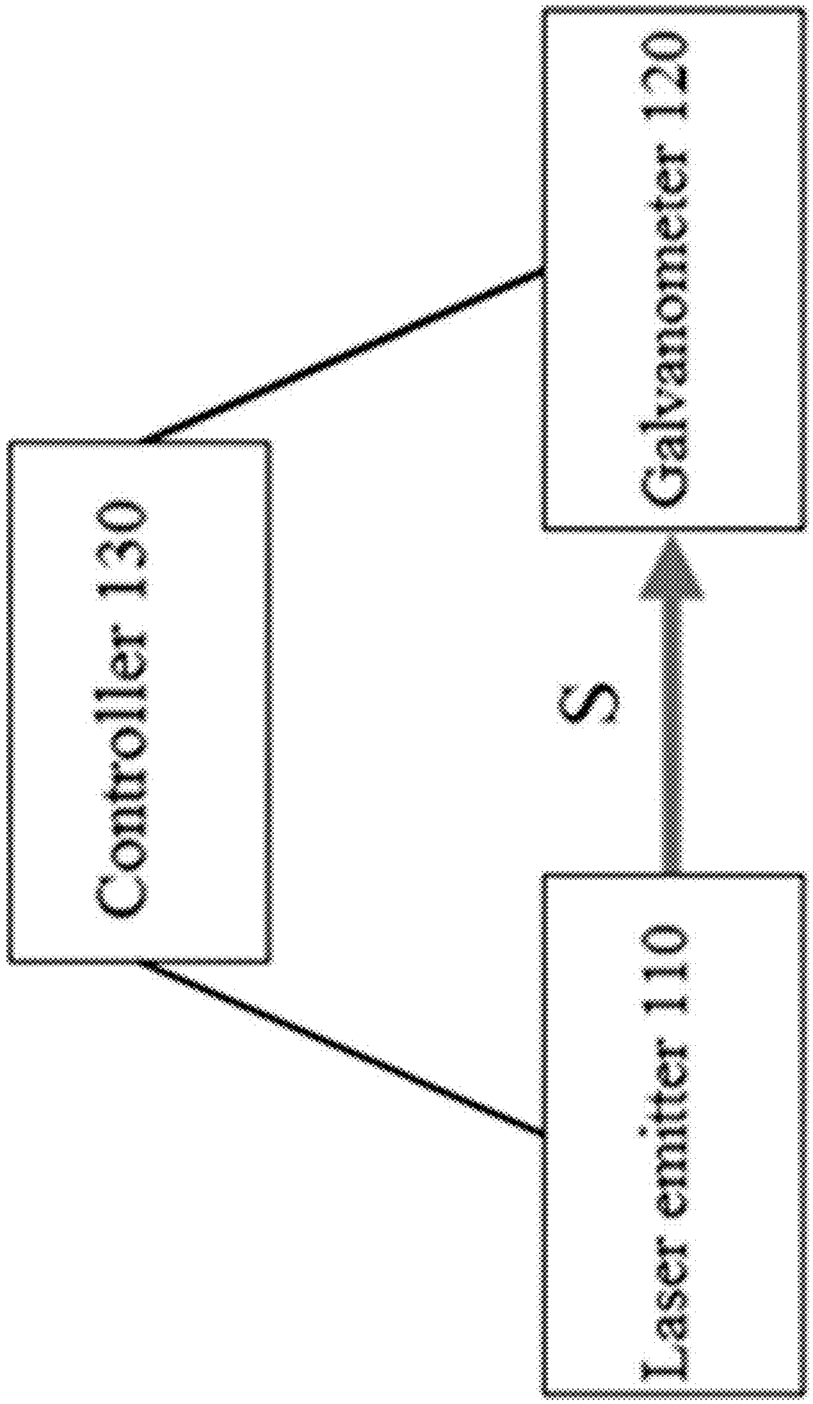
FIG. 1 is a schematic structural diagram of a LiDAR according to an embodiment of this application.
Figure 2:
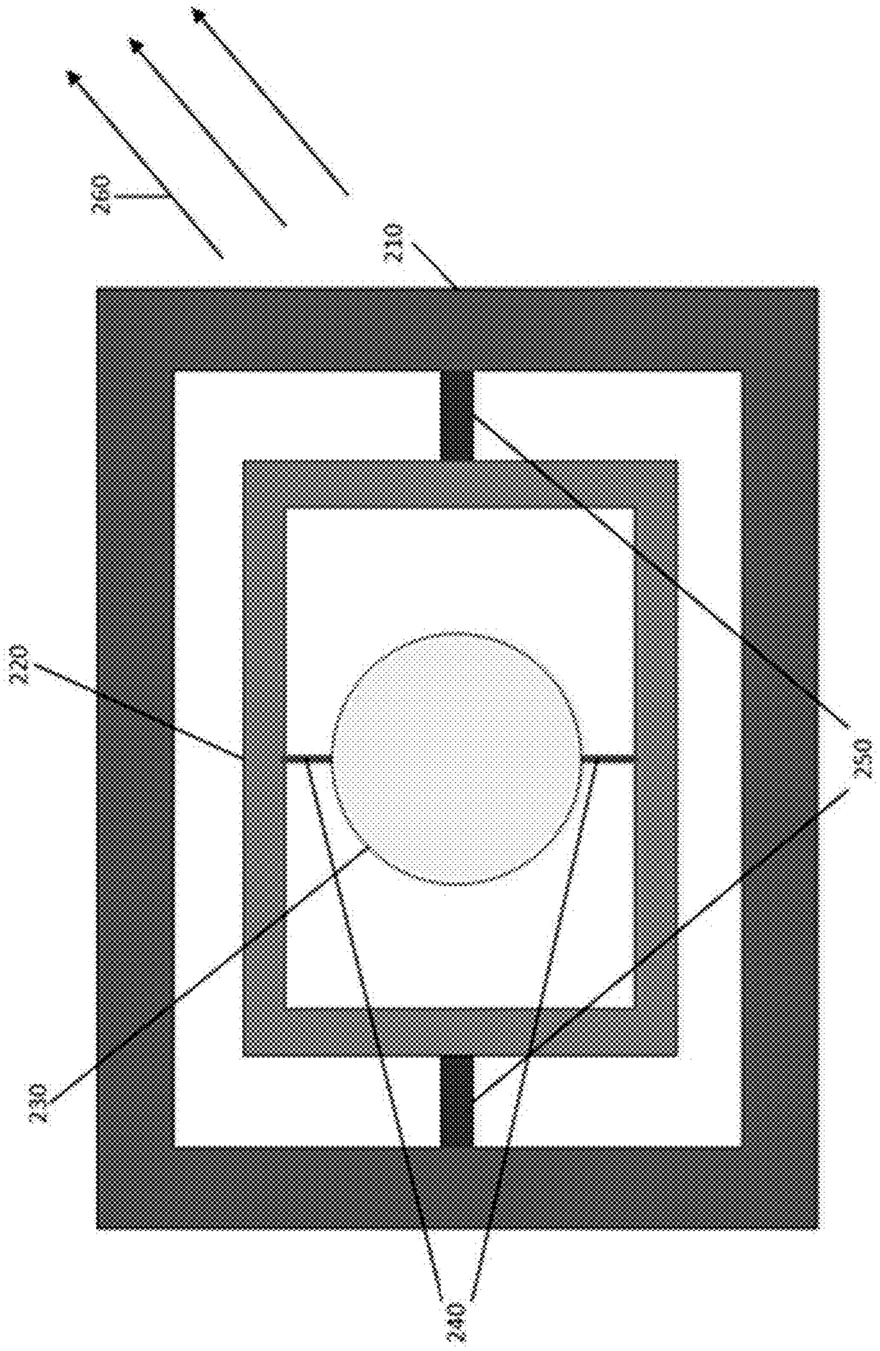
FIG. 2 is a schematic structural diagram of a MEMS galvanometer according to an embodiment of this application.

FIG. 1 exemplarily shows a schematic structural diagram of a LiDAR according to an embodiment of this application. As shown in FIG. 1, the LiDAR may include: a laser emitter 110, a galvanometer 120 and a controller 130. The laser emitter 110 is configured to emit a laser beam S. The galvanometer 120 is configured to receive and deflect the laser beam S emitted by the laser emitter 110 to change an outgoing angle of the laser beam S to implement scanning. The controller 130 is connected to both the laser emitter 110 and the galvanometer 120 and is configured to send an emission drive signal to control the laser emitter 110 to emit the laser beam S. and to send a galvanometer drive signal to control movement of the galvanometer 120, and so on. The foregoing galvanometer 120 may be a MEMS galvanometer. With reference to FIG. 2, the following describes a structure of the galvanometer 120 in the LiDAR shown in FIG. 1 when it is a MEMS galvanometer. FIG. 2 exemplarily shows a schematic structural diagram of a MEMS galvanometer according to an embodiment of this application. As shown in FIG. 2, the MEMS galvanometer may include: a base 210, a coil frame 220, a mirror 230, a fast axis 240, a slow axis 250, and an external magnetic field 260.

The base 210 is configured to fix and install the entire galvanometer structure, and has a hollow part in the middle to accommodate a movable component. The mirror 230 is configured to reflect the laser beam S; and the mirror 230 can also be rotated along the fast axis and the slow axis to drive the laser beam S to scan various positions in a field of view (image). When the fast axis and the slow axis are perpendicular to each other and a slow axis of the MEMS galvanometer is disposed along a horizontal direction, the MEMS galvanometer deflects along the fast axis to scan in a vertical direction, and the MEMS galvanometer deflects along the slow axis to scan in the horizontal direction.

Left and right sides of the coil frame 220 may be connected to the base 210 by providing the slow axis 250, and upper and lower sides of the coil frame 220 may be connected to the mirror 230 by providing the fast axis 240. The mirror 230 is rotated around the fast axis 240, and the coil frame 220 is rotated around the slow axis 250. Under joint action of electromagnetic force generated by the coil frame 220 and the external magnetic field 260, a movement of the mirror 230 in two directions is implemented.

Figure 3:
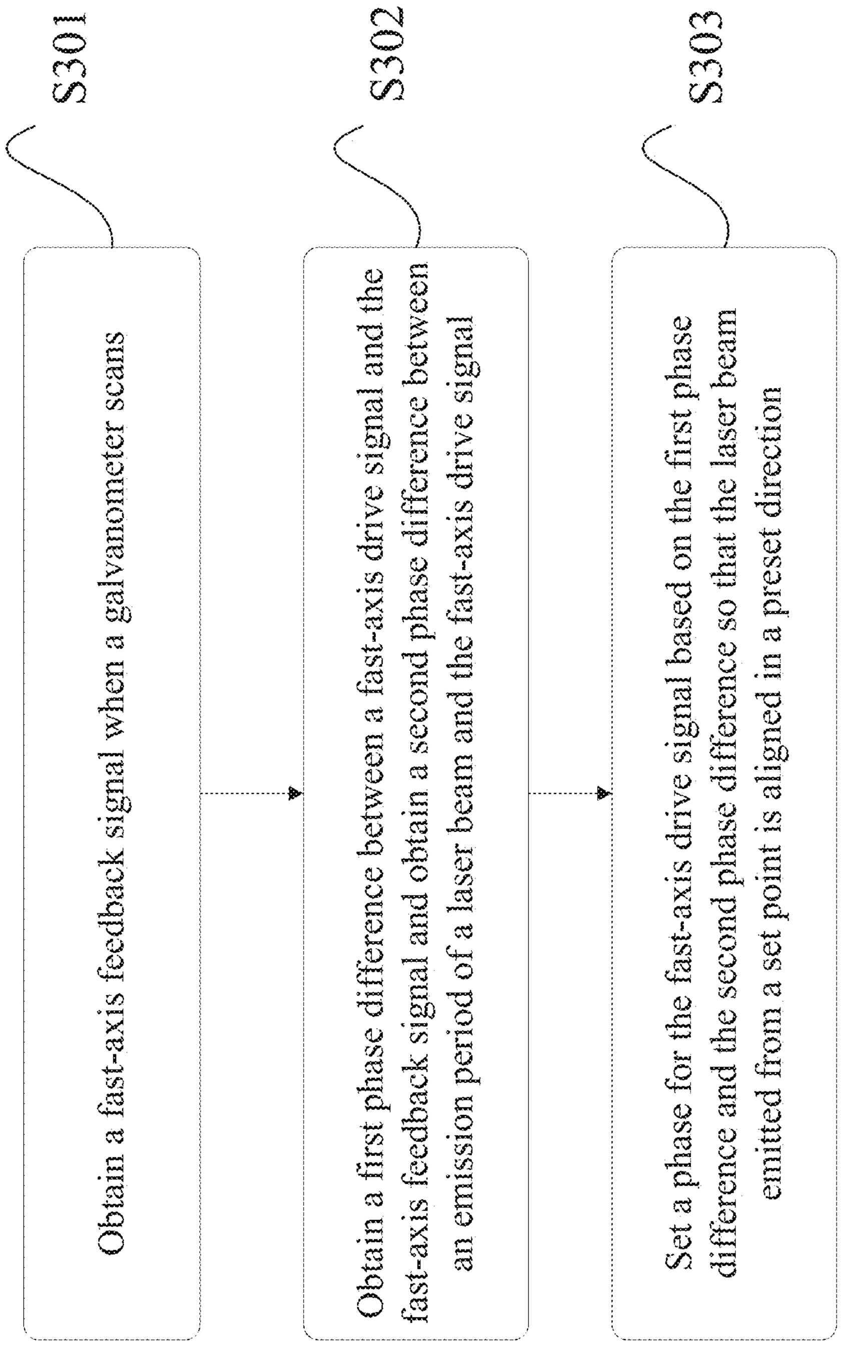
FIG. 3 is a schematic flowchart of a galvanometer-based laser synchronization controlling method according to an embodiment of this application.

FIG. 3 is a schematic flowchart of a galvanometer-based laser synchronization controlling method according to an embodiment of this application.

Referring to FIG. 3, the method includes the following steps.

S301. Obtain a fast-axis feedback signal when a galvanometer scans.

When the galvanometer scans, a fast-axis feedback signal can be obtained. The galvanometer in this embodiment of this application may be a galvanometer of the LiDAR, and may also be a galvanometer in a related device in another application scenario. A drive signal drives the galvanometer to perform a fast-axis movement and a slow-axis movement. A sinusoidal drive signal is used as the fast-axis drive signal, so that the galvanometer is in a resonance movement state in the fast-axis direction. The slow-axis drive signal is driven by a sawtooth wave, so that the galvanometer moves at a constant speed in the slow-axis direction. The fast-axis drive signal and the slow-axis drive signal are superimposed into a drive signal, and the drive signal is used to drive the galvanometer to move in two directions. A position feedback apparatus may be disposed on the galvanometer, and the position feedback apparatus outputs a feedback signal to the outside. The feedback signal includes a fast-axis feedback signal and a slow-axis feedback signal. The position feedback apparatus may be a displacement sensor disposed on the fast axis and the slow axis.

S302. Obtain a first phase difference between a fast-axis drive signal and the fast-axis feedback signal and obtain a second phase difference between an emission period of a laser beam and the fast-axis drive signal.

In an embodiment, a frequency of the fast-axis drive signal can be adjusted, and a phase difference between the fast-axis drive signal and the fast-axis feedback signal is used as the first phase difference when amplitude of the fast-axis feedback signal reaches a maximum value; and a phase of an emission period of the laser beam is adjusted, and when the laser beam is aligned in a preset direction, a phase difference between the emission period of the laser beam and the fast-axis drive signal is used as the second phase difference.

The first phase difference can be a phase difference between the fast-axis drive signal and the fast-axis feedback signal when a fast-axis moves in a resonant state. The galvanometer is driven by a fast-axis drive signal with fixed amplitude to move and a fast-axis feedback signal is obtained. A phase difference between the fast-axis drive signal and the fast-axis feedback signal when amplitude of the fast-axis feedback signal reaches the maximum value is the first phase difference between the fast-axis drive signal and the fast-axis feedback signal. The first phase difference between the fast-axis drive signal and the fast-axis feedback signal is fixed, a phase of an emission period of the laser beam is adjusted, and when the laser beam is aligned at a preset point, a phase difference between the emission period of the laser beam and the fast-axis drive signal is the second phase difference.

In an embodiment, a second phase difference between the emission period of the laser beam and the fast-axis drive signal can be obtained, where the second phase difference is set as a preset value; and a frequency of the fast-axis drive signal is adjusted, and when the laser beam is aligned in the preset direction, a phase difference between the fast-axis drive signal and the fast-axis feedback signal is used as the first phase difference. That is, the second phase difference between the emission period of the laser beam and the fast-axis drive signal can be set as the preset value. The second phase difference between the emission period of the laser beam and the fast-axis drive signal is fixed, and a frequency of the fast-axis drive signal is adjusted so that the phase difference between the fast-axis drive signal and the fast-axis feedback signal is adjusted; and when the laser beam is aligned at the preset point, the phase difference between the fast-axis drive signal and the fast-axis feedback signal is obtained, and the phase difference is used as the first phase difference.

S303. Set a phase for the fast-axis drive signal based on the first phase difference and the second phase difference so that the laser beam emitted from a set point is aligned in a preset direction.

A phase can be locked for the fast-axis drive signal and the fast-axis feedback signal based on the first phase difference, and a phase is fixed for the emission period of the laser beam and the fast-axis drive signal based on the second phase difference.

A phase can be set for the fast-axis drive signal based on the first phase difference and the second phase difference so that laser beams emitted when the fast-axis passes by the same set point in a round trip during a fast-axis period are aligned in a vertical direction.

In the technical solution provided in this application, after the first phase difference between the fast-axis drive signal and the fast-axis feedback signal is obtained and the second phase difference between the emission period of the laser beam and the fast-axis drive signal is obtained, the phase is set for the fast-axis drive signal based on the first phase difference and the second phase difference so that the laser beam emitted from the set point is aligned in the preset direction. Through the foregoing processing, the phase difference between the fast-axis drive signal and the fast-axis feedback signal is locked, the phase difference between the emission period of the laser beam and the fast-axis drive signal of the galvanometer is locked, and in this way, the laser beam emitted from the set point is aligned in the preset direction, and the emission period of the laser beam matches the fast-axis movement, thereby better implementing synchronization controlling of the emission period of the laser beam and the fast-axis movement of the galvanometer.

Figure 4:
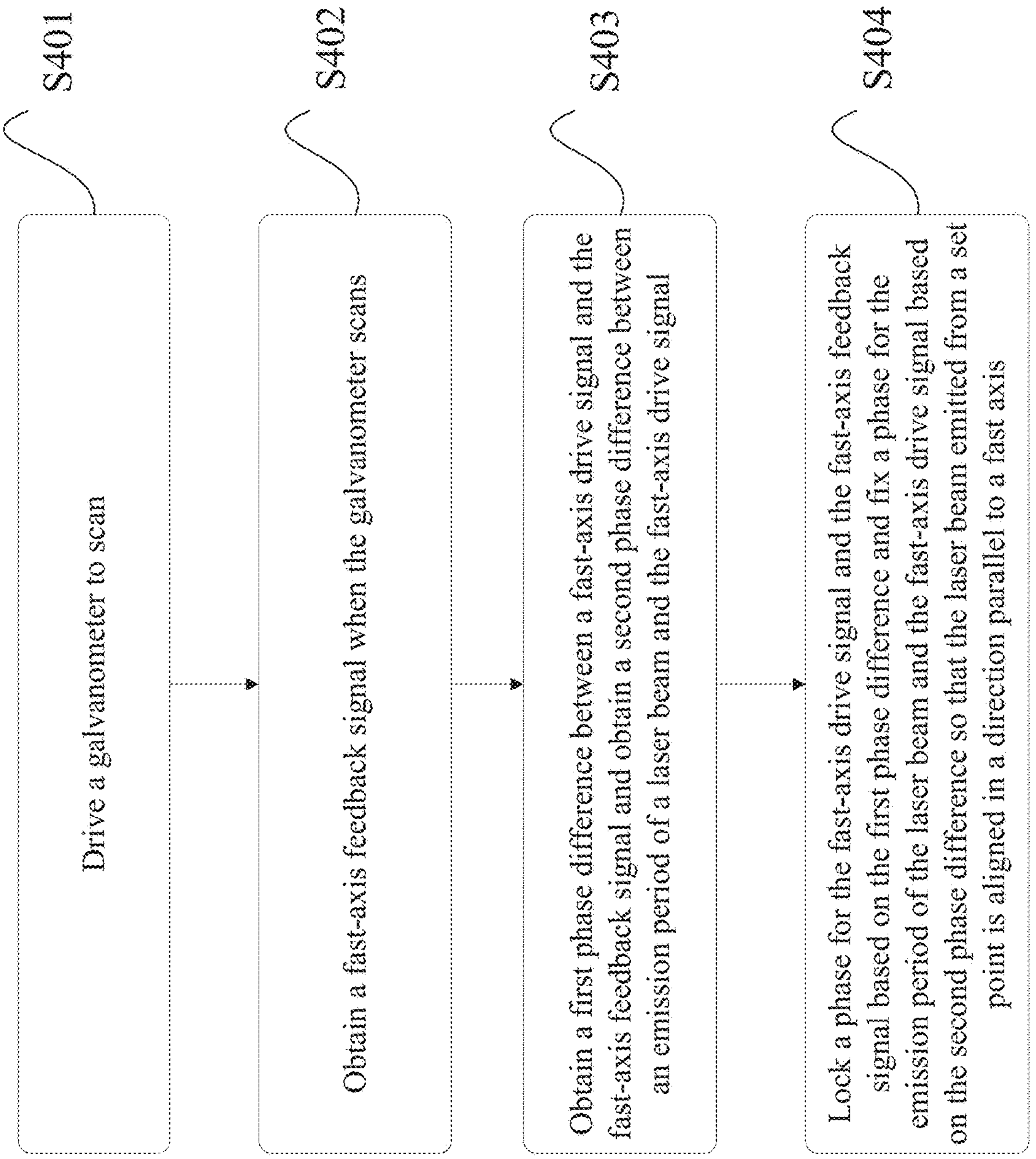
FIG. 4 is a schematic flowchart of a galvanometer-based laser synchronization controlling method according to another embodiment of this application.

FIG. 4 is a schematic flowchart of a galvanometer-based laser synchronization controlling method according to another embodiment of this application. The LiDAR in this embodiment of this application can calibrate the phase difference during working, calibrate a first phase difference between a fast-axis drive signal and the fast-axis feedback signal and calibrate a second phase difference between an emission period of a laser beam and the fast-axis drive signal.

Referring to FIG. 4, the method includes the following steps.

S401. Drive a galvanometer to scan.

The galvanometer in this embodiment of this application may be a galvanometer of the LiDAR provided in the foregoing embodiment, and may also be a galvanometer in a related device in another application scenario. A drive signal sent by the drive module can drive the galvanometer to move to implement scanning. The fast-axis drive signal and the slow-axis drive signal are superimposed into a drive signal. A sinusoidal drive signal may be used as the fast-axis drive signal, so that the galvanometer is in a resonance movement state in the fast-axis direction. The slow-axis drive signal may be driven by a sawtooth wave, so that the galvanometer moves non-resonantly at a constant speed in the slow-axis direction. When the LiDAR is in a working state, the fast-axis movement is used for row scanning through horizontal reciprocation, and the slow-axis movement is used for frame scanning through vertical reciprocation. In addition, directions can also be reversed, the row scanning can also be row scanning implemented through vertical reciprocation, and the frame scanning can be implemented through horizontal reciprocation, which specifically relates to a disposition position of the LiDAR.

The galvanometer in this application may be a micro-electro-mechanical-system galvanometer (MEMS galvanometer). The MEMS galvanometer can be a one-dimensional MEMS galvanometer or a two-dimensional MEMS galvanometer. The one-dimensional MEMS galvanometer is a MEMS galvanometer that can change a direction of an optical path in one direction, and a two-dimensional MEMS galvanometer is a MEMS galvanometer that can change the direction of the optical path in two directions.

S402. Obtain a fast-axis feedback signal when the galvanometer scans.

When the LiDAR is turned on and the galvanometer scans, the fast-axis feedback signal can be obtained.

A position feedback apparatus may be disposed on the galvanometer, and the position feedback apparatus outputs a feedback signal to the outside. The feedback signal includes a fast-axis feedback signal and a slow-axis feedback signal. The position feedback apparatus may be a displacement sensor disposed on the fast axis and the slow axis. In general, a feedback signal of the galvanometer can also be a sinusoidal signal.

S403. Obtain a first phase difference between a fast-axis drive signal and the fast-axis feedback signal and obtain a second phase difference between an emission period of a laser beam and the fast-axis drive signal.

There is a phase difference between the fast-axis feedback signal and the fast-axis drive signal.

The fast-axis movement of the galvanometer generally follows the second-order resonance movement, and a resonance point is a point with optimal energy utilization efficiency. Generally, a movement track of an ideal second-order resonance movement lags behind the drive signal by 90° in phase. That is, ideally, the phase difference between the fast-axis feedback signal and the fast-axis drive signal is 90°.

In an embodiment of this application, a frequency of the fast-axis drive signal is adjusted. When amplitude of the fast-axis feedback signal reaches a maximum value, a phase difference between the fast-axis drive signal and the fast-axis feedback signal is used as the first phase difference between the fast-axis drive signal and the fast-axis feedback signal.

A phase of an emission period of the laser beam is adjusted, and when the laser beam is aligned at the preset point, a phase difference between the emission period of the laser beam and the fast-axis drive signal is obtained, and the phase difference is used as the second phase difference. That is, the first phase difference can be a phase difference between the fast-axis drive signal and the fast-axis feedback signal when a fast-axis moves at a resonance frequency. A frequency at a resonance point of the feedback signal is the resonance frequency, and a phase at the resonance point is the first phase difference between the fast-axis drive signal and the fast-axis feedback signal.

In consideration of delay in hardware, to accurately learn the phase at the resonance point of the fast-axis feedback signal, calibration is generally required. The galvanometer is driven by a fast-axis drive signal with fixed amplitude to move and the fast-axis feedback signal is obtained. When amplitude of the fast-axis feedback signal reaches the maximum value, a corresponding frequency is the frequency at the resonance point, and the phase at the resonance point is the first phase difference between the fast-axis drive signal and the fast-axis feedback signal.

A first phase difference between the fast-axis drive signal and the fast-axis feedback signal is locked. In this case, if the frequency of the fast-axis drive signal is adjusted, the locked first phase difference is affected. To simplify a controlling and processing process, adjusting the phase of the emission period of the laser beam is adjusting the phase difference between the emission period of the laser beam and the fast-axis drive signal. When the laser beam is aligned at the preset point, a phase relationship between the emission period of the laser beam and the fast-axis drive signal meets a requirement for synchronization controlling of the laser beam. Laser beams emitted by the LiDAR w % ben the fast-axis passes by the same set point in a round trip during each fast-axis period are aligned in a vertical direction. The phase difference between the emission period of the laser beam and the fast-axis drive signal at this time is obtained and used as the second phase difference.

In an embodiment of this application, a second phase difference between the emission period of the laser beam and the fast-axis drive signal can be obtained, where the second phase difference is set as a preset value; and a frequency of the fast-axis drive signal is adjusted, and when the laser beam is aligned at the preset point, a phase difference between the fast-axis drive signal and the fast-axis feedback signal is obtained, and the phase difference is used as the first phase difference. In this application, the second phase difference may be set as a preset value, the second phase difference between the emission period of the laser beam and the fast-axis drive signal is obtained, where the second phase difference is set as the preset value. That is, a phase difference between the emission period of the laser beam and the fast-axis drive signal can be directly fixed as a preset value, for example, 90° or another phase close to 90°, for example, 87°, 89°, 91° or 93°.

The second phase difference between the fast-axis drive signal and the emission period of the laser beam is fixed. Adjusting a frequency of the fast-axis drive signal is adjusting a phase difference between the fast-axis drive signal and the fast-axis feedback signal. As mentioned above, when the laser beam is aligned at the preset point, the requirement for synchronization controlling of the laser beams is met. The phase difference between the fast-axis drive signal and the fast-axis feedback signal at this time is obtained and used as the first phase difference. In this way, a frequency of the fast-axis movement may slightly deviate from the resonance frequency with optimal efficiency. Setting the second phase difference as a preset value directly can reduce workload of obtaining the phase and simplify controlling and processing.

S404. Lock a phase for the fast-axis drive signal and the fast-axis feedback signal based on the first phase difference and fix a phase for the emission period of the laser beam and the fast-axis drive signal based on the second phase difference so that the laser beam emitted from a set point is aligned in a direction parallel to a fast axis.

In general, when the LiDAR is in a working state, the fast-axis movement is used for row scanning through horizontal reciprocation, and the slow-axis movement is used for frame scanning through vertical reciprocation. After the first phase locking and the second phase locking, the laser beam emitted by the LiDAR at the set point is aligned in the vertical direction.

Figure 5:
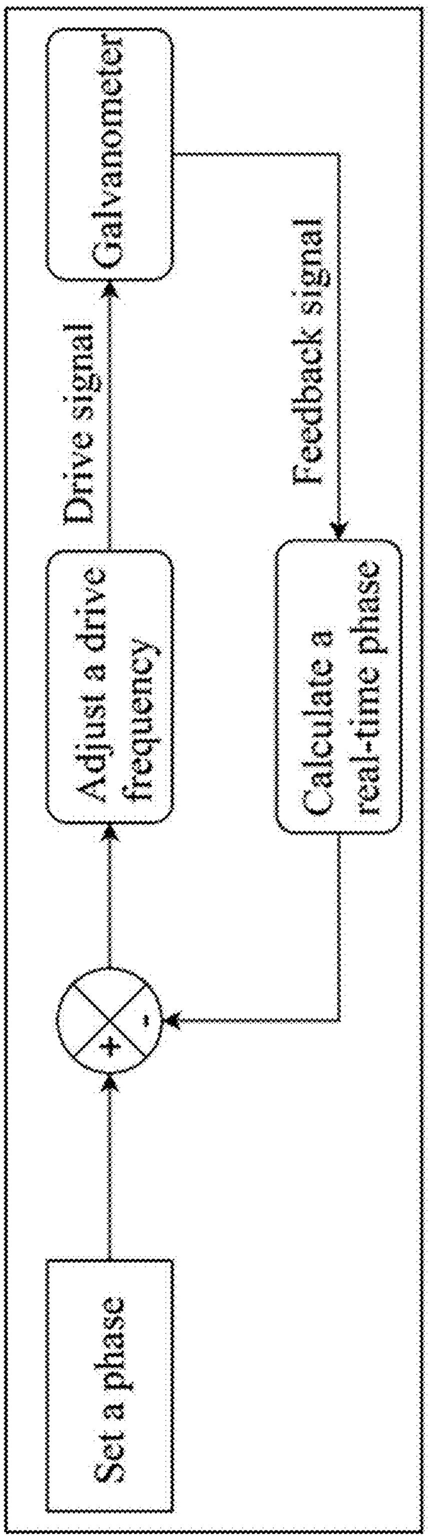
FIG. 5 is a schematic diagram of phase locking processing of a galvanometer-based laser synchronization controlling method according to an embodiment of this application.

A phase can be locked for the fast-axis drive signal and the fast-axis feedback signal based on the first phase difference. Phase locking is locking the phase difference between a drive signal and a feedback signal by adjusting a frequency of the drive signal, that is, a closed-loop system in which a processor maintains the phases of the fast-axis drive signal and the fast-axis feedback signal at a set value by adjusting the frequency of the fast-axis drive signal. Regarding the phase locking, refer to FIG. 5. In FIG. 5, the first phase difference between the fast-axis drive signal and the fast-axis feedback signal is maintained at 90°, and therefore, a set phase input into a comparator can be 90° On the other hand, the fast-axis feedback signal of the galvanometer is obtained, a real-time phase is obtained based on the fast-axis feedback signal, and the real-time phase is also input into the comparator. The comparator compares the set phase with the real-time phase and outputs a phase difference to the processor. The processor adjusts the drive frequency based on the phase difference to adjust the fast-axis drive signal and applies an adjusted fast-axis drive signal to the galvanometer. In this way, the frequency of the fast-axis drive signal is adjusted in real time, so that the phase difference between the fast-axis drive signal and the fast-axis feedback signal is maintained at the first phase difference, thereby implementing the phase locking.

The phase can be fixed for the emission period of the laser beam and the fast-axis drive signal based on the second phase difference. The second phase difference can be a preset value such as 90° or another phase close to 90°, for example, 87°, 89°, 910 or 93°, or the second phase difference can be obtained by adjusting the phase of the emission period of the laser beam. The emission period of the laser beam is determined via the emission drive signal. The emission drive signal and the fast-axis drive signal do not affect each other and have the same period. Therefore, a time difference between start time of the emission drive signal and start time of the fast-axis drive signal can be determined via the second phase difference. A system clock is disposed inside the LiDAR, and the processor can send a clock signal to an emission drive module and a galvanometer drive module. The emission drive module and the galvanometer drive module send the fast-axis drive signal and the emission drive signal respectively per a fixed time difference. The fast-axis drive signal is sent to the galvanometer, and the emission drive signal is sent to a laser, so that the second phase difference between the fast-axis drive signal and the emission period of the laser beam can be fixed, thereby fixing the phase.

The alignment operation of the laser beams is aligning laser beams in the vertical direction that are emitted by the LiDAR when passing by a same set point in a round trip during a fast-axis period. For example, based on whether an edge of a detected object in point cloud data is flush, it can be determined whether the laser beams are aligned in the vertical direction. In each fast-axis period, laser beams emitted when the LiDAR passes by the same set point in a round tnp are aligned in the vertical direction; and in a different fast-axis period, laser beams emitted when the LiDAR passes by the same set point in a round trip are also aligned in the vertical direction.

When the maximum deflection angle of the galvanometer is a rated angle, reference amplitude of the fast-axis feedback signal is obtained, and amplitude of the fast-axis drive signal is adjusted in a closed loop so that feedback amplitude of the fast-axis feedback signal of the galvanometer reaches the reference amplitude.

Figure 6:
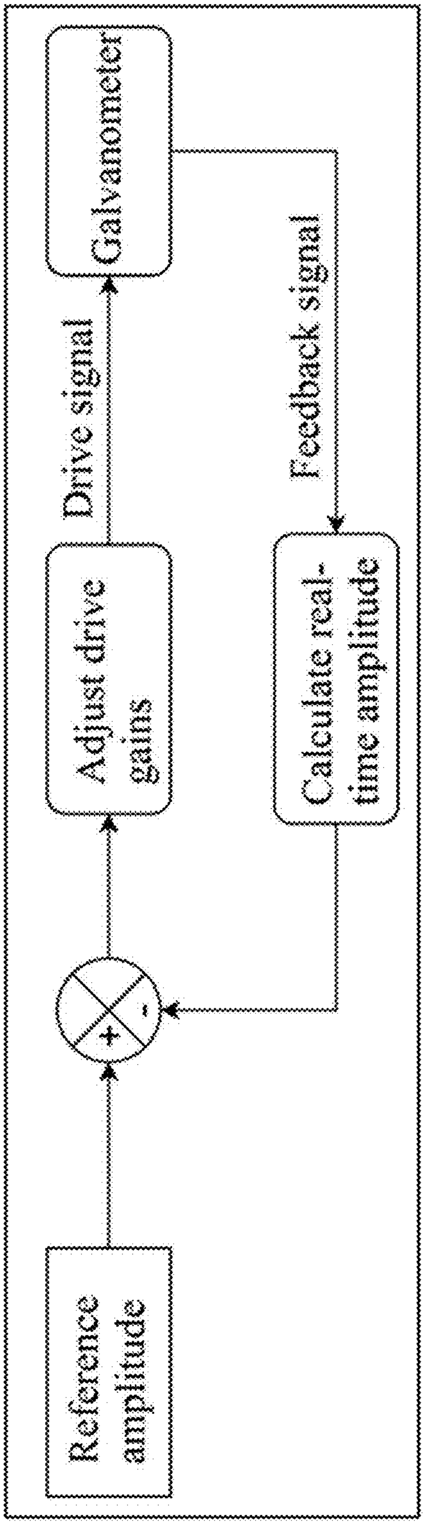
FIG. 6 is a schematic diagram of a closed-loop adjustment of amplitude of a fast-axis drive signal of a galvanometer in a galvanometer-based laser synchronization controlling method according to an embodiment of this application.

A working frequency of the fast axis is relatively high, and main movement resistance is wind resistance. Under different air pressures, wind resistance is different, which causes fixed gains of the galvanometer. Under different air pressures, amplitude of the fast-axis movement is different. Because a fast-axis displacement sensor of the position feedback apparatus is not affected by air pressure, the fast-axis displacement sensor can be used in this application. The fast-axis displacement sensor of the galvanometer can be used to record a deflection angle of the galvanometer, and when a maximum deflection angle of the galvanometer reaches a rated angle, amplitude of the fast-axis feedback signal of the galvanometer can be obtained as the reference amplitude, and the amplitude of the fast-axis drive signal is adjusted in the closed loop so that the feedback amplitude of the fast-axis feedback signal of the galvanometer reaches the reference amplitude. Through the foregoing processing, the amplitude of the fast-axis movement of the galvanometer is prevented from being affected by a change of air pressure, and real-time air pressure adaptability during the working process of the galvanometer is implemented. Regarding a process of closed-loop adjustment of output amplitude gains of the galvanometer, refer to FIG. 6. FIG. 6 is a schematic diagram of closed-loop adjustment of amplitude of a fast-axis drive signal of a galvanometer in the galvanometer-based laser synchronization controlling method according to an embodiment of this application. For example, when the maximum deflection angle of the galvanometer reaches a rated angle, amplitude of the fast-axis feedback signal of the galvanometer obtained is 25. 25 is used as the reference amplitude and the amplitude of the fast-axis drive signal is adjusted in the closed loop so that the feedback amplitude of the fast-axis feedback signal of the galvanometer reaches the reference amplitude and a stable relationship is maintained. Based on a comparison between the reference amplitude and the real-time amplitude, the drive gains can be adjusted, thereby adjusting the drive signal and applying the adjusted drive signal to the galvanometer.

To maintain a fixed scanning angle, in an embodiment, sealing processing may also be performed, so that a small working environment where the fast axis of the galvanometer works is not affected by a change in an external air pressure. Alternatively, a barometer can be mounted on the galvanometer to sense an actual air pressure, and then required amplitude gains of the fast-axis drive signal of the galvanometer can be calculated based on a lookup table or a formula written in advance. That is, the working environment of the galvanometer can be set as a sealed environment; or a working air pressure of the galvanometer that is detected by an air pressure sensor mounted on the LiDAR is obtained, and the preset amplitude gains of the fast-axis drive signal of the galvanometer is determined for drive use based on the working air pressure.

Solution in this embodiment of this application relates to control of a fast-axis resonance movement and control of a laser ranging moment, so that the fast-axis movement can be at a point with optimal resonance efficiency and synchronization of laser beam emission in different environments (temperature and air pressures) can also be realized. In an embodiment, based on the phase locking of the fast axis, the synchronization controlling of the emission period of the laser beam and the fast-axis movement of the galvanometer can be implemented by calibrating a locked phase. In addition, the fast-axis feedback sensor can be used for a closed-loop adjustment of the amplitude to implement air pressure adaptability without adding additional sensors or complicated sealing processing.

A method procedure in this embodiment of this application is described above, and correspondingly, an embodiment of this application also provides a galvanometer-based laser synchronization controlling apparatus and a LiDAR.

Figure 7:
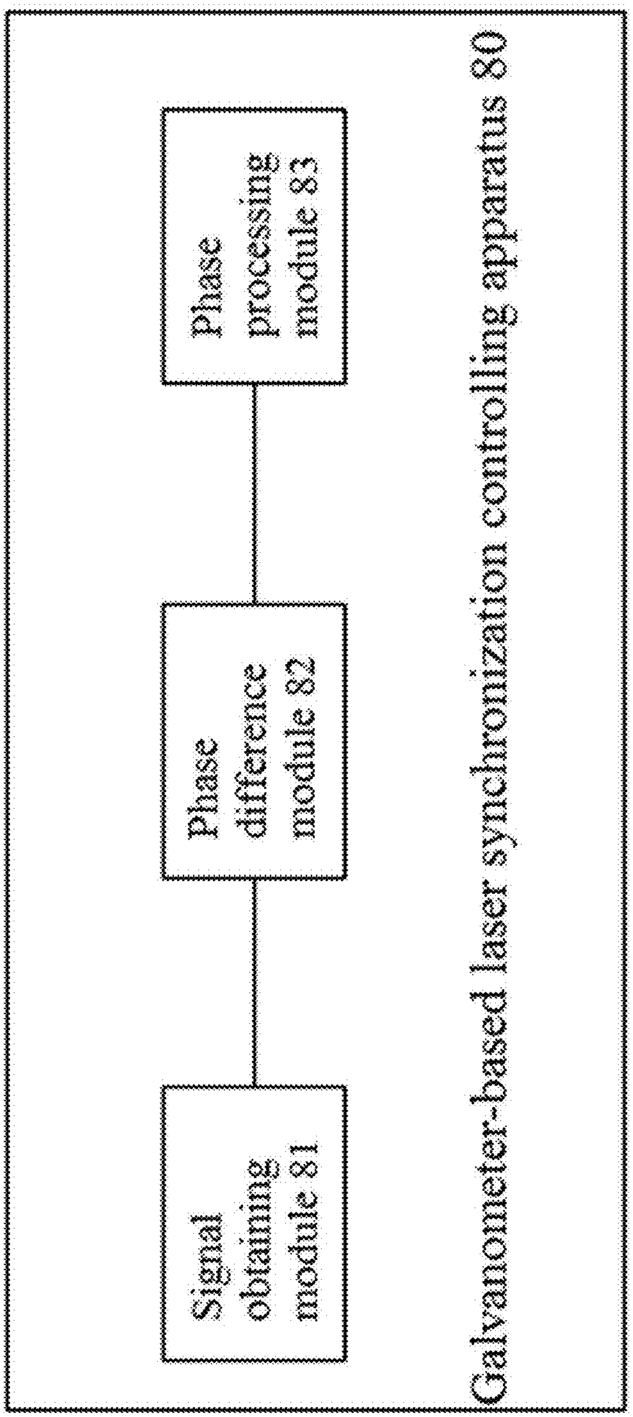
FIG. 7 is a schematic structural diagram of a galvanometer-based laser synchronization controlling apparatus according to an embodiment of this application.

FIG. 7 is a schematic structural diagram of a galvanometer-based laser synchronization controlling apparatus according to an embodiment of this application.

Referring to FIG. 7, a galvanometer-based laser synchronization controlling apparatus 80 provided in this application includes a signal obtaining module 81, a phase difference module 82 and a phase processing module 83.

The signal obtaining module 81 is configured to obtain a fast-axis feedback signal when a galvanometer scans. When the galvanometer scans, a fast-axis feedback signal can be obtained. A drive signal drives the galvanometer to perform a fast-axis movement and a slow-axis movement. A sinusoidal drive signal is used as the fast-axis drive signal, so that the galvanometer is in a resonance movement state in the fast-axis direction. The slow-axis drive signal is driven by a sawtooth wave, so that the galvanometer moves at a constant speed in the slow-axis direction. The fast-axis drive signal and the slow-axis drive signal are superimposed into a drive signal, and the drive signal is used to drive the galvanometer to move in two directions. A position feedback apparatus may be disposed on the galvanometer, and the position feedback apparatus outputs a feedback signal to the outside. The feedback signal includes a fast-axis feedback signal and a slow-axis feedback signal.

The phase difference module 82 is configured to: obtain a first phase difference between the fast-axis drive signal and the fast-axis feedback signal and obtain a second phase difference between an emission period of a laser beam and the fast-axis drive signal. In an embodiment, a frequency of the fast-axis drive signal can be adjusted, and a phase difference between the fast-axis drive signal and the fast-axis feedback signal is used as the first phase difference when amplitude of the fast-axis feedback signal reaches a maximum value. A phase of an emission period of the laser beam is adjusted, and w % ben the laser beam is aligned at a preset point, a phase difference between the emission period of the laser beam and the fast-axis drive signal is obtained, and the phase difference is used as the second phase difference. In another embodiment, a second phase difference between the emission period of the laser beam and the fast-axis drive signal can be obtained, where the second phase difference is set as a preset value; and a frequency of the fast-axis drive signal is adjusted, and when the laser beam is aligned at the preset point, a phase difference between the fast-axis drive signal and the fast-axis feedback signal is obtained, and the phase difference is used as the first phase difference.

The phase processing module 83 is configured to set a phase for the fast-axis drive signal based on the first phase difference and the second phase difference that are obtained by the phase difference module 82 so that a laser beam emitted from a set point is aligned in a preset direction. The phase processing module 83 can set a phase for the fast-axis drive signal based on the first phase difference and the second phase difference so that laser beams emitted when a LiDAR passes by a same set point in a round trip during a fast-axis period are aligned in a vertical direction.

Based on the galvanometer-based laser synchronization controlling apparatus provided in this application, after the first phase difference between the fast-axis drive signal and the fast-axis feedback signal is obtained and the second phase difference between the emission period of the laser beam and the fast-axis drive signal is obtained, the phase is set for the fast-axis drive signal based on the first phase difference and the second phase difference so that the laser beam emitted from the set point is aligned in the preset direction. Through the foregoing processing, the phase difference between the fast-axis drive signal and the fast-axis feedback signal is locked and the phase difference between the emission period of the laser beam and the fast-axis drive signal of the galvanometer is locked. In this way, the laser beam emitted from the set point is aligned in the preset direction, and the emission period of the laser beam matches the fast-axis movement, thereby better implementing synchronization controlling of the emission period of the laser beam and the fast-axis movement of the galvanometer.

Figure 8:
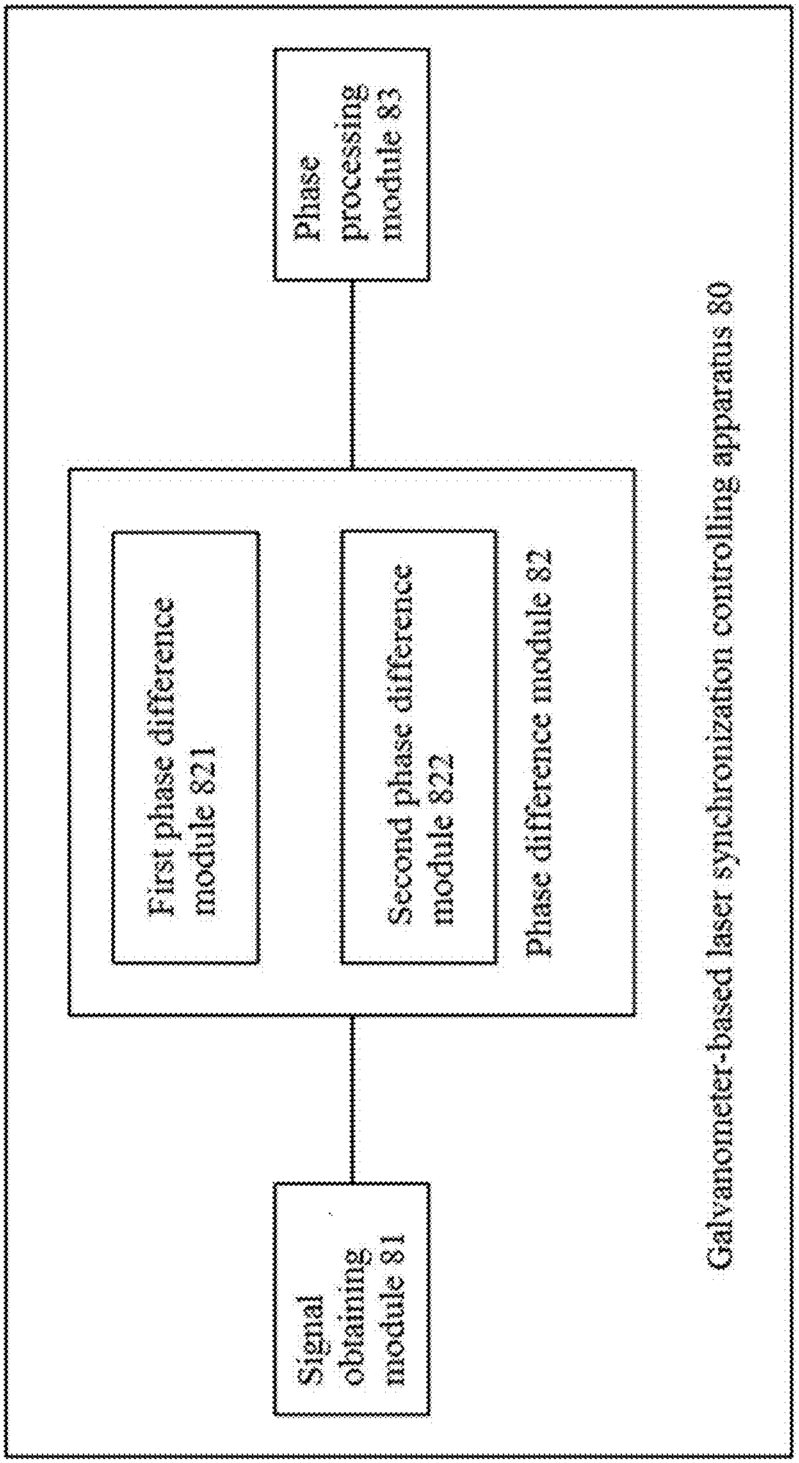
FIG. 8 is a schematic structural diagram of a galvanometer-based laser synchronization controlling apparatus according to another embodiment of this application.

FIG. 8 is a schematic structural diagram of a galvanometer-based laser synchronization controlling apparatus according to another embodiment of this application.

Referring to FIG. 8, the galvanometer-based laser synchronization controlling apparatus 80 provided in this application includes a signal obtaining module 81, a phase difference module 82 and a phase processing module 83. The phase difference module 82 includes a first phase difference module 821 and a second phase difference module 822.

Regarding functions of the signal obtaining module 81 and the phase processing module 83, refer to description of FIG. 8.

In an embodiment, details are as follows.

The first phase difference module 821 is configured to adjust a frequency of the fast-axis drive signal, and to use a phase difference between the fast-axis drive signal and the fast-axis feedback signal as the first phase difference when amplitude of the fast-axis feedback signal reaches the maximum value; and the second phase difference module 822 is configured to adjust a phase of an emission period of the laser beam, and when the laser beam is aligned at the preset point, to obtain a phase difference between the emission period of the laser beam and the fast-axis drive signal, and to use the phase difference as the second phase difference.

In an embodiment, details are as follows:

the second phase difference module 822 is configured to obtain the second phase difference between the emission period of the laser beam and the fast-axis drive signal, where the second phase difference is set as a preset value; and the first phase difference module 821 is configured to adjust a frequency of the fast-axis drive signal, and when the laser beam is aligned at the preset point, to obtain a phase difference between the fast-axis drive signal and the fast-axis feedback signal, and to use the phase difference as the first phase difference.

The galvanometer-based laser synchronization controlling apparatus 80 may also include an amplitude adjusting module (not shown in the figure).

The amplitude adjusting module is configured to, obtain reference amplitude of the fast-axis feedback signal and adjust amplitude of the fast-axis drive signal in a closed loop when the maximum deflection angle of the galvanometer is a rated angle, so that feedback amplitude of the fast-axis feedback signal of the galvanometer reaches the reference amplitude.

Figure 9:
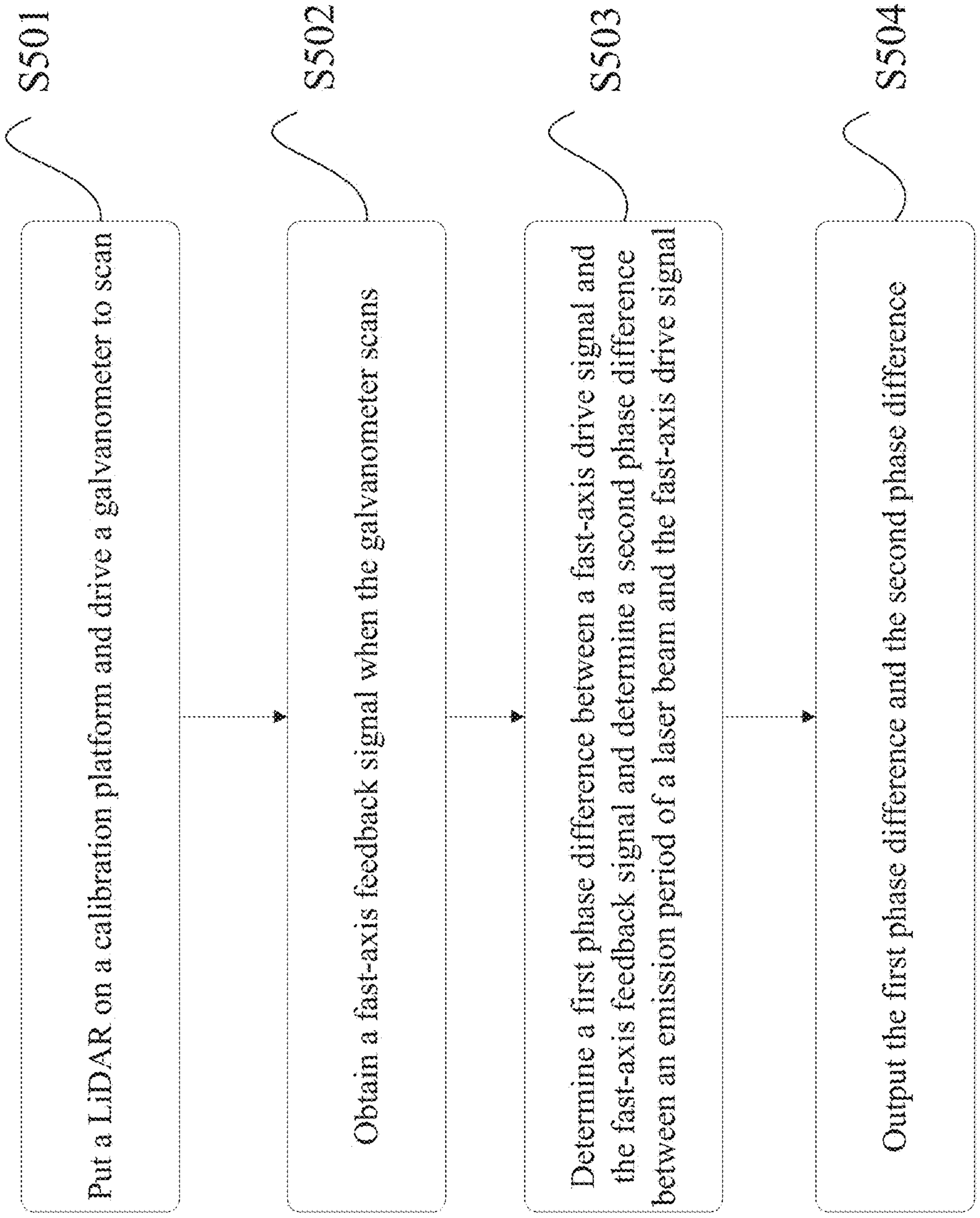
FIG. 9 is a schematic flowchart of a galvanometer-based laser synchronization calibration method according to another embodiment of this application.

FIG. 9 shows a galvanometer-based laser synchronization calibration method according to an embodiment of this application. The LiDAR in this embodiment of this application can calibrate a phase difference during working as mentioned in the foregoing embodiment, or can alternatively calibrate the phase difference, then write the phase difference into a register of the LiDAR in advance, and can invoke the phase difference during the working of the LiDAR.

Referring to FIG. 9, the method includes the following steps.

S501. Put a LiDAR on a calibration platform and drive a galvanometer to scan.

After being assembled, the LiDAR can be put in a preset environment for calibration of various parameters, and calibration results can be written into a register of the LiDAR so that the LiDAR can accurately detect and output a detection result. A calibration platform and a target are generally provided in a preset environment used for calibration. The LiDAR is put on the calibration platform to calibrate the first phase difference and the second phase difference.

A step of driving the galvanometer to scan is similar to step S401 above. Details are not described herein again.

S502. Obtain a fast-axis feedback signal when the galvanometer scans.

When the LiDAR is turned on and the galvanometer scans, a fast-axis feedback signal can be obtained. Step S502 is similar to step S402 above. Details are not described herein again.

S503. Determine a first phase difference between a fast-axis drive signal and the fast-axis feedback signal and determine a second phase difference between an emission period of a laser beam and the fast-axis drive signal.

In this step, a frequency of the fast-axis drive signal can be adjusted, and a phase difference between the fast-axis drive signal and the fast-axis feedback signal is used as the first phase difference when amplitude of the fast-axis feedback signal reaches the maximum value; and a phase of an emission period of the laser beam is adjusted, and when the laser beam is aligned at a preset point, a phase difference between the emission period of the laser beam and the fast-axis drive signal is determined as the second phase difference.

In this step, a second phase difference between the emission period of the laser beam and the fast-axis drive signal can be further determined as a preset value; and a frequency of the fast-axis drive signal is adjusted, and when the laser beam is aligned at the preset point, a phase difference between the fast-axis drive signal and the fast-axis feedback signal is determined as the first phase difference.

An alignment operation of the laser beams is aligning laser beams in a vertical direction that are emitted by the LiDAR when the LiDAR passes by the same set point in a round trip during a fast-axis period.

Figure 10:
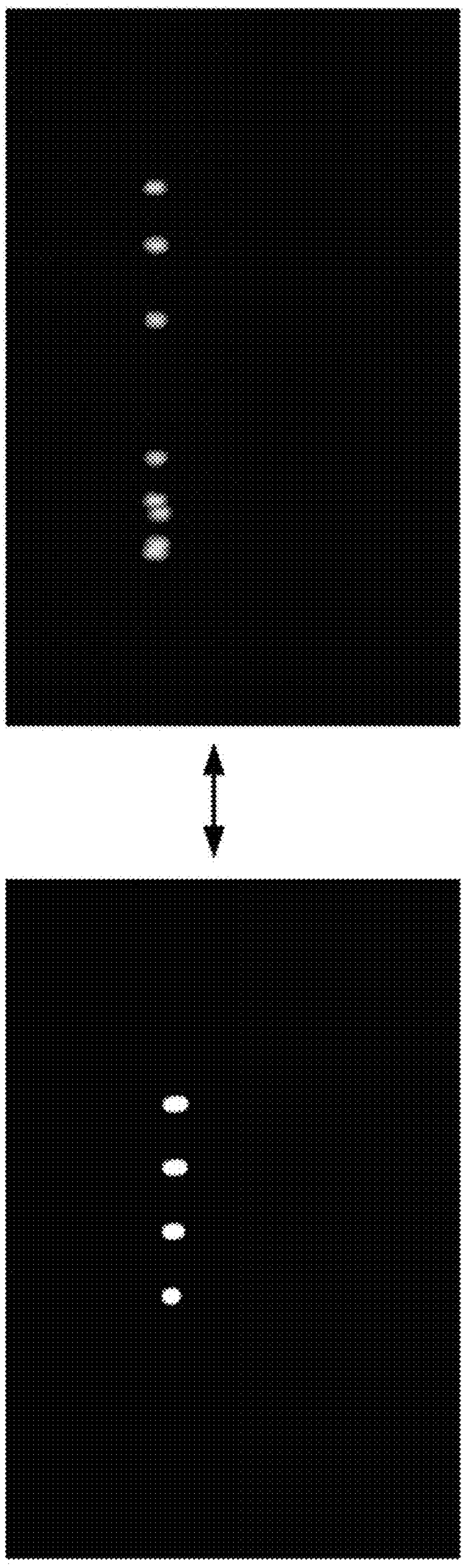
FIG. 10 is a schematic diagram of comparison between laser beam alignment and laser beam misalignment according to an embodiment of this application.

For example, as shown in FIG. 10, to facilitate observation of a position of the laser beam, a receiving screen can be disposed in front of the LiDAR, and a laser spot can be observed when a laser beam is incident on the receiving screen. FIG. 10 is a schematic diagram of comparison between laser beam alignment and laser beam misalignment according to an embodiment of this application. A left part of FIG. 10 is a schematic diagram of aligned laser beams, and a right part of FIG. 10 is a schematic diagram of misaligned laser beams. The right part of FIG. 10 corresponds to an unadjusted case, and it can be seen that 8 laser spots are obviously staggered. The left part of FIG. 10 corresponds to an adjusted case with the laser beams aligned in the vertical direction, and at this time, only 4 laser spots can be seen.

In an embodiment, in each fast-axis period, laser beams emitted w % ben the LiDAR passes by the same set point in a round trip are aligned in the vertical direction; and in different fast-axis periods, laser beams emitted when the LiDAR passes by the same set point in a round trip are also aligned in the vertical direction.

In a case of passing by a same set point in the round trip, for example, multiple set points, such as 87°, 89°, 91° or 93°, can be selected around a moment at which a laser beam needs to be emitted for the first time in each fast-axis period and the set points are delayed by 90° in phase; and 273°, 271°, 269° or 267° is determined as the same set point for return via a delay by 270° in phase. A laser beam is emitted when the LiDAR passes by the same set point in the round trip. When the laser beams at two positions are aligned in the vertical direction, it indicates that synchronization alignment is implemented after adjustment.

S504. Output the first phase difference and the second phase difference.

In this step, the determined first phase difference between the fast-axis drive signal and the fast-axis feedback signal and the determined second phase difference between the emission period of the laser beam and the fast-axis drive signal are output.

In some embodiments, after the fast-axis feedback signal when the galvanometer scans is obtained, a first phase difference between the fast-axis drive signal and the fast-axis feedback signal is determined, the second phase difference between the emission period of the laser beam and the fast-axis drive signal is determined and the first phase difference and the second phase difference are output. Through the foregoing processing, the phase difference between the fast-axis drive signal and the fast-axis feedback signal is calibrated in advance, and the phase difference between the emission period of the laser beam and the fast-axis drive signal of the galvanometer is calibrated in advance, so that the LiDAR can directly use the first phase difference and the second phase difference that are calibrated in advance, to implement synchronization calibration of the emission period of the laser beam and the fast-axis movement of the galvanometer.

Figure 11:
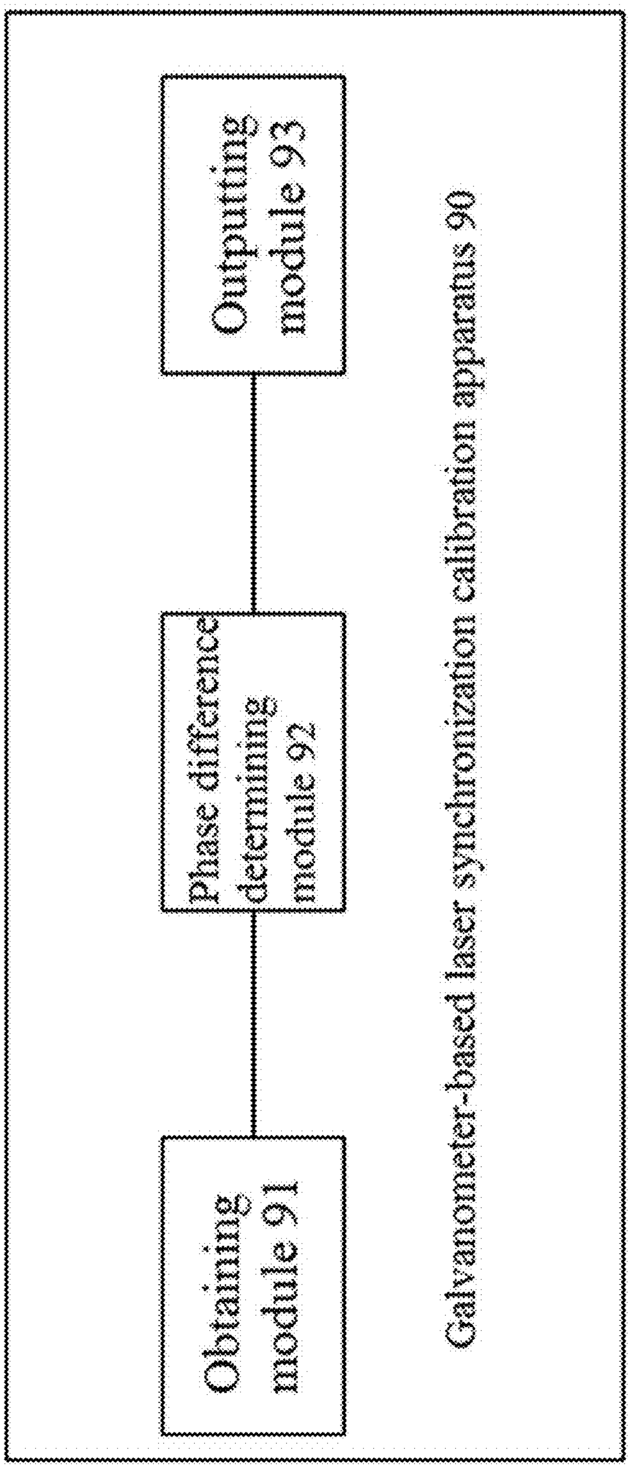
FIG. 11 is a schematic structural diagram of a galvanometer-based laser synchronization calibration apparatus according to an embodiment of this application.

FIG. 11 is a schematic structural diagram of a galvanometer-based laser synchronization calibration apparatus according to an embodiment of this application.

Referring to FIG. 11, the galvanometer-based laser synchronization calibration apparatus 90 includes an obtaining module 91, a phase difference determining module 92 and an outputting module 93.

The obtaining module 91 is configured to obtain a fast-axis feedback signal when a galvanometer scans.

The phase difference determining module 92 is configured to determine a first phase difference between a fast-axis drive signal and the fast-axis feedback signal and to determine a second phase difference between an emission period of a laser beam and the fast-axis drive signal.

The outputting module 93 is configured to output the first phase difference and the second phase difference.

The phase difference determining module 92 can adjust a frequency of the fast-axis drive signal, and use a phase difference between the fast-axis drive signal and the fast-axis feedback signal as the first phase difference when amplitude of the fast-axis feedback signal reaches a maximum value; and the phase difference determining module 92 can adjust a phase of the emission period of the laser beam, and can determine a phase difference between the emission period of the laser beam and the fast-axis drive signal as the second phase difference when the laser beam is aligned at a preset point.

The phase difference determining module 92 can further determine the second phase difference between the emission period of the laser beam and the fast-axis drive signal as a preset value, adjust a frequency of the fast-axis drive signal, and can determine the phase difference between the fast-axis drive signal and the fast-axis feedback signal as the first phase difference when the laser beam is aligned at the preset point.

Based on the galvanometer-based laser synchronization calibration apparatus provided in this application, after the fast-axis feedback signal when the galvanometer scans is obtained, the first phase difference between the fast-axis drive signal and the fast-axis feedback signal is determined, the second phase difference between the emission period of the laser beam and the fast-axis drive signal is determined and the first phase difference and the second phase difference are output. Through the foregoing processing, the phase difference between the fast-axis drive signal and the fast-axis feedback signal is calibrated in advance, and the phase difference between the emission period of the laser beam and the fast-axis drive signal of the galvanometer is calibrated in advance, so that the LiDAR can directly use the first phase difference and the second phase difference that are calibrated in advance, to implement synchronization calibration of the emission period of the laser beam and the fast-axis movement of the galvanometer.

Figure 12:
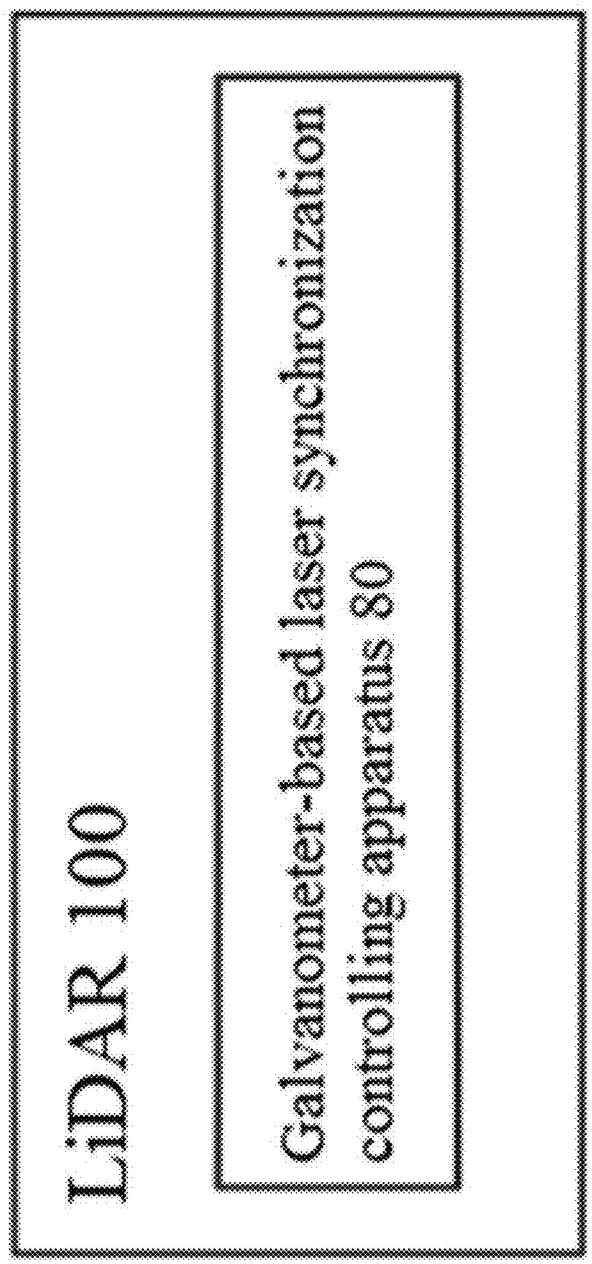
FIG. 12 is a schematic structural diagram of a LiDAR according to an embodiment of this application.

FIG. 12 is a schematic structural diagram of a LiDAR according to an embodiment of this application.

Referring to FIG. 12, the LiDAR 100 includes the foregoing galvanometer-based laser synchronization controlling apparatus 80. Regarding a function and a structure of the galvanometer-based laser synchronization controlling apparatus 80, refer to description of FIG. 7 or FIG. 8.

Figure 13:
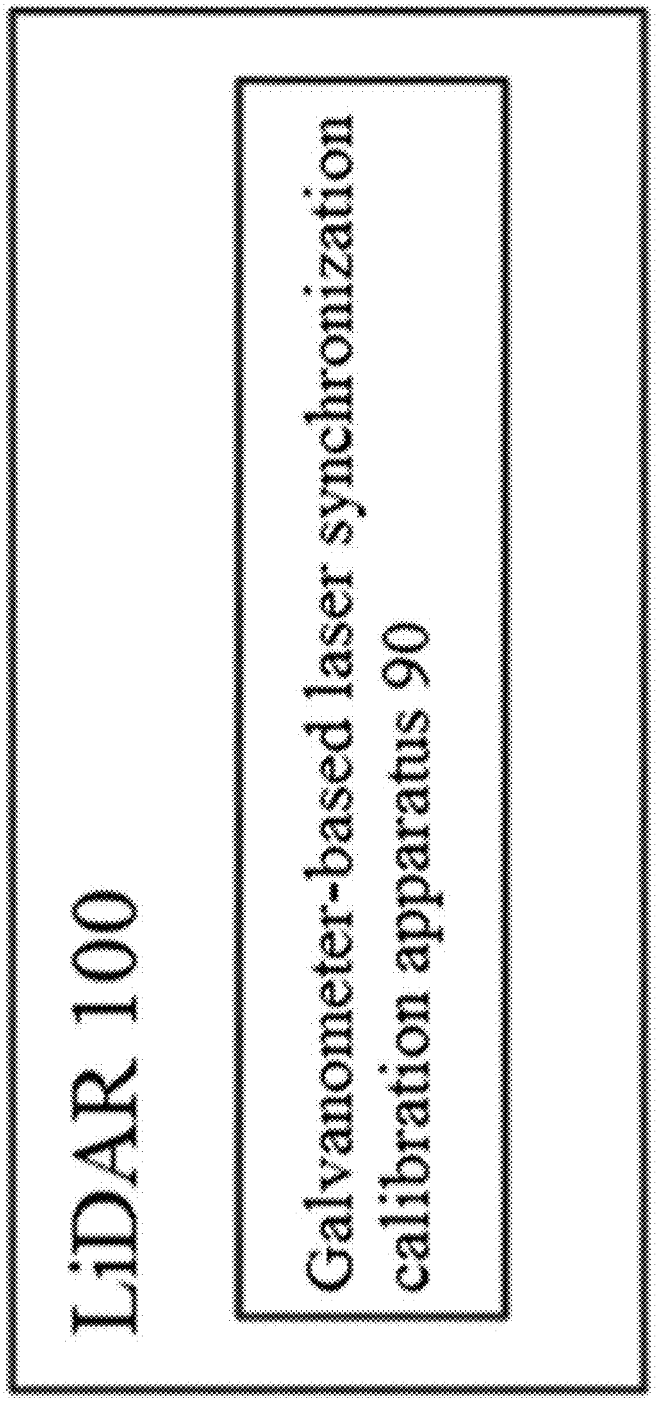
FIG. 13 is a schematic structural diagram of a LiDAR according to another embodiment of this application.

FIG. 13 is a schematic structural diagram of LiDAR according to an embodiment of this application.

Referring to FIG. 13, the LiDAR 100 includes the foregoing galvanometer-based laser synchronization calibration apparatus 90. For a function and a structure of the galvanometer-based laser synchronization calibration apparatus 90, refer to description of FIG. 11.

For the apparatus in this embodiment, how the modules implement the operations has been described in the embodiments of the method in detail, and no further elaboration is provided herein.

Figure 14:
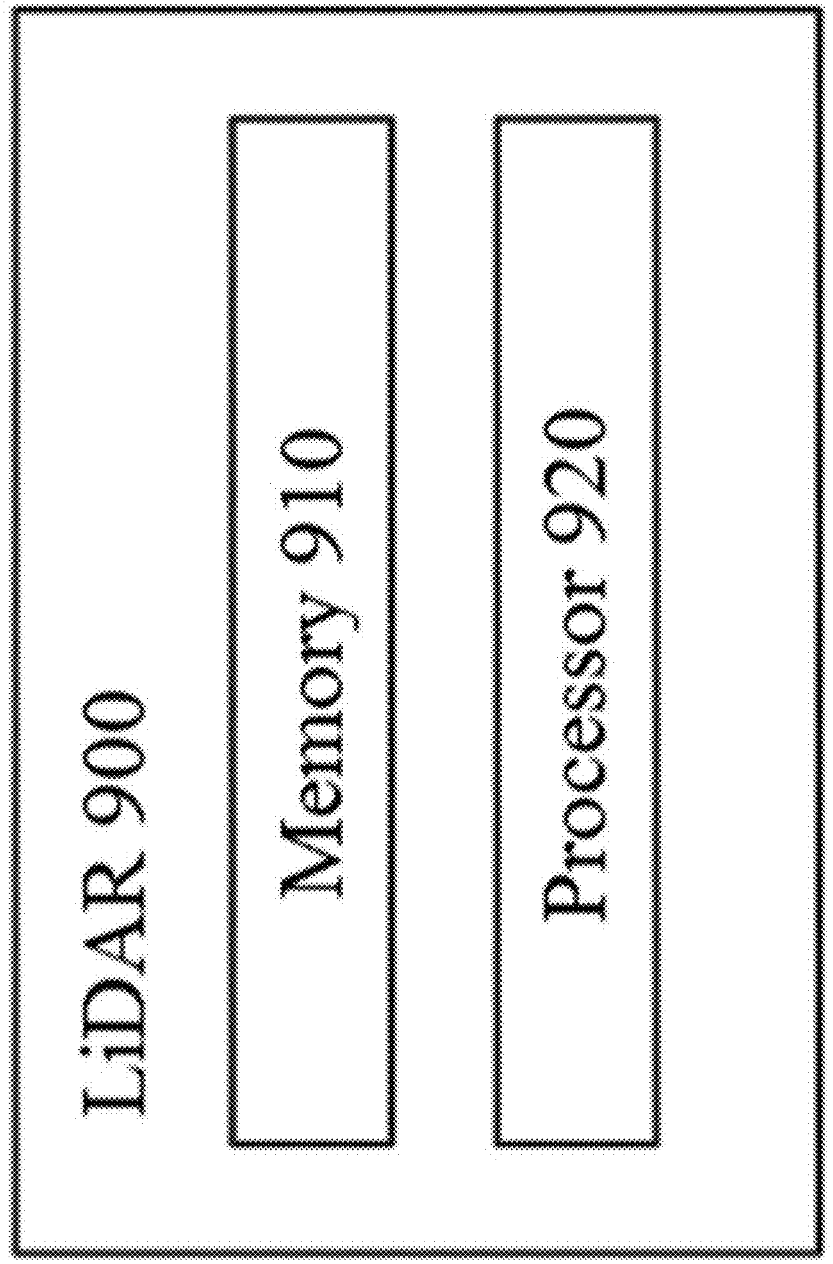
FIG. 14 is a schematic structural diagram of a LiDAR according to another embodiment of this application.

FIG. 14 is a schematic structural diagram of a LiDAR according to an embodiment of this application.

Referring to FIG. 14, a LiDAR 900 includes a memory 910 and a processor 920.

The processor 920 may be a central processing unit (CP U), or may be another general-purpose processor, a digital signal processor (DSP), an application specific integrated circuit (ASIC), a field-programmable gate array (FPGA) or another programmable logic device, a discrete gate or transistor logic device, a discrete hardware component, or the like. The general-purpose processor can be a microprocessor, or the processor can be any conventional processor or the like.

The memory 910 may include various types of storage units such as a system memory, a read-only memory (ROM), and a permanent storage device. The ROM can store static data or an instruction required by the processor 920 or another module of the computer. The permanent storage device can be a readable/writable storage device. The permanent storage device can be a non-volatile storage that does not lose stored instructions and data even if the computer is powered off. In some embodiments, the permanent storage device uses a large-capacity storage device (for example, a magnetic or optical disk, or a flash memory). In some other implementations, the permanent storage device can be a removable storage device (e.g., a floppy disk, a CD-ROM drive). A system memory can be a readable/writable storage device or a volatile readable/writable storage device, for example, a dynamic random access memory. The system memory can store some or all of instructions and data required by the processor during running. In addition, the memory 910 may include any combination of computer-readable storage media, including various types of semiconductor memory chips (for example, a DRAM, an SRAM, an SDRAM, a flash memory, and a programmable read-only memory), and the magnetic disk and/or the optical disk may also be used. In some embodiments, the memory 910 may include a readable and/or writable erasable storage device, for example, a compact disc (CD), a read-only digital versatile disc (for example, a DVD-ROM and a dual-layer DVD-ROM), a read-only Blu-ray disc, a super density disc, a flash card (for example, an SD card, a mini-SD card and a Micro-SD card), and a magnetic floppy disk. The computer-readable storage medium does not include a carrier wave or a transient electronic signal transmitted wirelessly or by wire.

Executable code is stored in the memory 910, and when being processed by the processor 920, the executable code may enable the processor 920 to perform a part or all of the foregoing method.

In addition, the method according to the present application can also be implemented as a computer program or a computer program product, where the computer program or the computer program product includes computer program code instructions for executing some or all of the steps in the above method in the present application.

Alternatively, the present application can be implemented as a computer-readable storage medium (or a non-transitory machine-readable storage medium or a machine-readable storage medium) having executable codes stored thereon (or the computer program or computer instruction codes). When executed by the processor (a server, or the like) of the electronic apparatus, the executable codes (or the computer program or the computer instruction codes) cause the processor to execute some or all of the steps in the above method in the present application.

What is claimed is:

1. A galvanometer-based laser synchronization controlling method, comprising:

obtaining a fast-axis feedback signal when a galvanometer scans;

obtaining a first phase difference between a fast-axis drive signal and the fast-axis feedback signal and obtaining a second phase difference between an emission period of a laser beam and the fast-axis drive signal; and setting a phase for the fast-axis drive signal based on the first phase difference and the second phase difference.

2. The method according to claim 1, wherein obtaining the first phase difference between the fast-axis drive signal and the fast-axis feedback signal and obtaining the second phase difference between the emission period of the laser beam and the fast-axis drive signal comprises:

adjusting a frequency of the fast-axis drive signal, and using a phase difference between the fast-axis drive signal and the fast-axis feedback signal as the first phase difference when amplitude of the fast-axis feedback signal reaches a maximum value; and adjusting a phase of an emission period of the laser beam, and when the laser beam is aligned at the preset point, obtaining a phase difference between the emission period of the laser beam and the fast-axis drive signal, and using the phase difference as the second phase difference.

3. The method according to claim 1, wherein obtaining the first phase difference between the fast-axis drive signal and the fast-axis feedback signal and obtaining the second phase difference between the emission period of the laser beam and the fast-axis drive signal further comprises:

obtaining the second phase difference between the emission period of the laser beam and the fast-axis drive signal, wherein the second phase difference is set as a preset value; and adjusting a frequency of the fast-axis drive signal, and when the laser beam is aligned at the preset point, obtaining a phase difference between the fast-axis drive signal and the fast-axis feedback signal, and using the phase difference as the first phase difference.

4. The method according to claim 1, wherein setting the phase for the fast-axis drive signal based on the first phase difference and the second phase difference comprises:

locking a phase for the fast-axis drive signal and the fast-axis feedback signal based on the first phase difference; and fixing a phase for the emission period of the laser beam and the fast-axis drive signal based on the second phase difference.

5. The method according to claim 1, wherein setting the phase for the fast-axis drive signal based on the first phase difference and the second phase difference further comprises:

setting a phase for the fast-axis drive signal based on the first phase difference and the second phase difference so that laser beams emitted by a LiDAR when the LiDAR passes by the same set point in a round trip during a fast-axis period are aligned in a vertical direction.

6. The method according to claim 1, wherein the method further comprises;

when a maximum deflection angle of the galvanometer is a rated angle, obtaining reference amplitude of the fast-axis feedback signal and adjusting amplitude of the fast-axis drive signal in a closed loop so that feedback amplitude of the fast-axis feedback signal of the galvanometer reaches the reference amplitude.

7. A galvanometer-based laser synchronization controlling apparatus, comprising:

a signal obtaining module, configured to obtain a fast-axis feedback signal when a galvanometer scans;

a phase difference module, configured to obtain a first phase difference between a fast-axis drive signal and the fast-axis feedback signal and obtain a second phase difference between an emission period of a laser beam and the fast-axis drive signal; and a phase processing module, configured to set a phase for the fast-axis drive signal based on the first phase difference and the second phase difference that are obtained by the phase difference module.

8. The apparatus according to claim 7, wherein the phase difference module comprises:

a first phase difference module, configured to adjust a frequency of the fast-axis drive signal, and to use a phase difference between the fast-axis drive signal and the fast-axis feedback signal as the first phase difference when amplitude of the fast-axis feedback signal reaches a maximum value, and a second phase difference module, configured to adjust a phase of an emission period of the laser beam, and when the laser beam is aligned at the preset point, to obtain a phase difference between the emission period of the laser beam and the fast-axis drive signal, and to use the phase difference as the second phase difference.

9. The apparatus according to claim 8, wherein the phase difference module further comprises:

a second phase difference module, configured to obtain the second phase difference between the emission period of the laser beam and the fast-axis drive signal, wherein the second phase difference is set as a preset value; and a first phase difference module, configured to adjust a frequency of the fast-axis drive signal, and when the laser beam is aligned at the preset point, to obtain the phase difference between the fast-axis drive signal and the fast-axis feedback signal, and to use the phase difference as the first phase difference.

10. A galvanometer-based laser synchronization calibration method, comprising:

obtaining a fast-axis feedback signal when a galvanometer scans;

determining a first phase difference between a fast-axis drive signal and the fast-axis feedback signal and determining a second phase difference between an emission period of a laser beam and the fast-axis drive signal; and outputting the first phase difference and the second phase difference.

11. The method according to claim 10, wherein determining the first phase difference between the fast-axis drive signal and the fast-axis feedback signal and determining the second phase difference between the emission period of the laser beam and the fast-axis drive signal comprises:

adjusting a frequency of the fast-axis drive signal, and using the phase difference between the fast-axis drive signal and the fast-axis feedback signal as the first phase difference when amplitude of the fast-axis feedback signal reaches a maximum value; and adjusting a phase of the emission period of the laser beam, and when the laser beam is aligned at a preset point, determining a phase difference between the emission period of the laser beam and the fast-axis drive signal as the second phase difference.

12. The method according to claim 10, wherein determining the first phase difference between the fast-axis drive signal and the fast-axis feedback signal and determining the second phase difference between the emission period of the laser beam and the fast-axis drive signal further comprises:

determining the second phase difference between the emission period of the laser beam and the fast-axis drive signal as a preset value; and adjusting a frequency of the fast-axis drive signal, and when the laser beam is aligned at a preset point, determining a phase difference between the fast-axis drive signal and the fast-axis feedback signal, and using the phase difference as the first phase difference.

* * * * *